United States Patent
Miyamoto

(10) Patent No.: US 6,473,207 B1
(45) Date of Patent: Oct. 29, 2002

(54) IMAGE SIZE TRANSFORMATION METHOD FOR ORTHOGONAL TRANSFORMATION CODED IMAGE

(75) Inventor: Yoshihiro Miyamoto, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/138,557

(22) Filed: Aug. 24, 1998

(30) Foreign Application Priority Data

Aug. 26, 1997 (JP) .............................. 9-229385

(51) Int. Cl.$^7$ ................................. H04N 1/46
(52) U.S. Cl. ...................... 358/539; 382/250
(58) Field of Search ............... 358/539; 382/250, 382/432, 433, 348, 395, 403, 408, 298, 299, 248, 166, 277, 280

(56) References Cited

U.S. PATENT DOCUMENTS

| | | | |
|---|---|---|---|
| 5,101,438 A | * 3/1992 | Kanda et al. | 382/9 |
| 5,483,475 A | * 1/1996 | Kao | 364/725 |
| 5,684,536 A | * 11/1997 | Sugiyama | 382/250 |
| 5,703,649 A | * 12/1997 | Kondo | 348/408 |
| 5,845,015 A | * 12/1998 | Martucci | 382/250 |
| 5,875,039 A | * 2/1999 | Ohsawa | 358/435 |
| 5,886,794 A | * 3/1999 | Kondo | 358/428 |
| 5,899,966 A | * 5/1999 | Matsumoto | 704/205 |
| 5,937,095 A | * 8/1999 | Machida | 382/233 |
| 6,075,906 A | * 6/2000 | Fenwick | 382/298 |

FOREIGN PATENT DOCUMENTS

| | | | | |
|---|---|---|---|---|
| JP | 2-76472 | | 3/1990 | |
| JP | 2-122767 | | 5/1990 | |
| JP | 63276511 | * | 5/1990 | |
| JP | 3-204268 | | 9/1991 | |
| JP | 4-192696 | | 7/1992 | |
| JP | 4-229382 | | 8/1992 | |
| JP | 4-271664 | | 9/1992 | |
| JP | 5-41800 | | 2/1993 | |
| JP | 5-122682 | | 5/1993 | |
| JP | 7-23381 | | 1/1995 | |
| JP | 7-129759 | | 5/1995 | |
| JP | 8-180194 | | 7/1996 | |
| JP | 8-294001 | | 11/1996 | |
| JP | 08315129 A | * | 11/1996 | ............. G06T/3/40 |
| JP | 10-13665 | | 1/1998 | |
| JP | 10-210273 | | 8/1998 | |
| JP | 10227191 | * | 2/2000 | ............. H04N/7/30 |

OTHER PUBLICATIONS

Japanese Office Action, dated Feb. 15, 2000, with English language translation of Japanese Examiner's comments.

* cited by examiner

*Primary Examiner*—Jerome Grant, II
*Assistant Examiner*—Negussie Worku
(74) *Attorney, Agent, or Firm*—Whitham, Curtis & Christofferson, P.C.

(57) ABSTRACT

In an image size transformation method for an orthogonal transformation coded image, orthogonal coefficients as coded data of an image are read out by blocks, after which an operation process for transforming the coefficients on the orthogonal coefficients is carried out. Due to this operation process, coefficients of Y blocks are obtained from coefficients of X blocks, by which the orthogonal coefficients after having the image size enlarged or reduced are outputted. Due to this structure, it is possible to simplify the decoding system. According to the image size transformation method of the present invention, orthogonal transformation coefficients are processed directly on the coefficients by which a transformation of high precision is possible, while there is no possibility that a transformation efficiency will deteriorate because of operation errors caused by inversion or filtering, as in the conventional case.

6 Claims, 12 Drawing Sheets

IMAGE SIZE TRANSFORMATION METHOD FOR ORTHOGONAL TRANSFORMATION CODED IMAGE

BACKGROUND OF THE INVENTION

The present invention relates to an image size transformation method for an orthogonal transformation coded image, particularly to that which enlarges and reduces the image size of coded data in respect with compression coding of an image using an orthogonal transformation.

DESCRIPTION OF THE RELATED ART

A conventional image size transformation method for an orthogonal transformation coded image is defined as a method for acquiring coded data of an enlarged or a reduced image size from coded data of an image compressed by an orthogonal transformation.

As to the image size transformation method for obtaining the coded data, the following image size transformation method is the most typical. The coded data, i.e. orthogonal transformation coefficients, is once reproduced into an image by an inversion. Then the image size is enlarged or reduced by interpolating or thinning out pixels at the image space, after which the image goes through compression coding by the application of the orthogonal transformation for the second time. FIG. 1 shows a processing procedure of such enlargement process. Note that a reduction process would require the same processing procedure. In this conventional image size transformation method, however, not only enlargement/reduction process of the image size is required but also an inversion of the orthogonal transformation coefficients and a repetition of the. orthogonal transformation process are required. Accordingly, it is noted as a disadvantage that the whole image size transformation process would become complicated.

This sort of image size enlargement method is applied to a spatial scalable coding system in connection with the IS 13818-2 standard which is being internationally standardized by ISO/IEC JTCI/SC29/WG11. In this system, an image is coded with a low resolution, i.e. a small image size. The coding result is then referred to so as to code the image by a high resolution, i.e. a large image size. In coding a high resolution image, the data of the orthogonal transformation coefficients of the previously coded low resolution image is once inverted and brought back to a decoded image. This decoded image is then enlarged on the image space to become estimate data. Then with respect to each pixel of the high resolution image, difference data is obtained by making reference to the estimate data, after which the difference data is coded by the orthogonal transformation. In this system, the orthogonal transformation coefficients which are obtained by coding the low resolution image have to be once inverted, which means that an extra operation is required. Moreover, because an interpolation process using a band pass filter is required in enlarging the decoded image and generating the estimate data, there is a possibility that estimation errors should occur due to problems relating to operational precision and filtering characteristics of the interpolation process. In this respect, it becomes an issue that the coding efficiency is easily deteriorated.

Furthermore, as to another image size transformation method for enlarging or reducing a size of an image, there is known a method in which coefficients are added to or eliminated from in enlarging or reducing the image size. For example, according to an image enlargement method as disclosed in Japanese Patent Laid-Open Publication No. 2-76472, orthogonal transformation coefficients which are obtained by two dimentional discrete cosine transformation by a (N×N) point block unit are applied to a low frequency side of a (M×M) point block where M>N, while zero values are applied to a high frequency side of the block so as to obtain orthogonal transformation coefficients of (M×M) points. Then by inverting the orthogonal transformation coefficients of (M×M) points after transformation, by the two dimensional discrete cosine transformation of (M×M) points, it is possible to obtain a decoded image being enlarged by M/N times. On the other hand, by eliminating the high frequency side of the orthogonal transformation coefficients of (N×N) points, generating coefficients of a (K×K) point block where K<N, and inverting the coefficients by the two-dimentional discrete cosine transformation of (K×K) points, it is possible to obtain a decoded image being reduced by K/N times.

FIG. 2 shows a concept of such enlarging and reducing process. As to a similar image size transformation method, there is known a high quality image enlargement method disclosed in Japanese Patent Laid-Open Publication No. 3-204268. In the disclosure, instead of carrying out the process of applying zero values to the high frequency side as in the former method, values being anticipated by an autoregressive model are applied from the coefficients of the low frequency side. By the application of such process, it is possible to obtain a seemingly enlarged decoded image with high resolution components being reinforced.

However, in respect with the image size transformation method of the two prior art disclosures mentioned above, various magnifications and reduction ratios such as (M/N) time enlargement and (K/N) time reduction are possible. On the other hand, in decoding the orthogonal transformation coefficients after having the image size transformed, inverse orthogonal transformation of different sample points must be carried out depending on the magnification or reduction ratio. Accordingly, in respect with a decoding means which is usually provided beforehand with only a predetermined inverse orthogonal transformation function, there is a possibility that the coded data cannot be decoded. Furthermore, in case when a decoding device applicable for various magnifications and reduction ratios is made possible by a hardware circuit, it might be a problem that the circuit structure would become complicated.

SUMMARY OF THE INVENTION

It is therefore an object of the present invention to provide a more efficient image size transformation method for an orthogonal transformation coded image, which is capable of enlarging and reducing a size of an image on orthogonal transformation coefficients, thus requiring a small operation amount.

According to a first aspect of the present invention there is provided an image size transformation method for an orthogonal transformation coded image, enlarging or reducing an image size of coded data, in respect with an image compressing and coding using an orthogonal transformation, comprising the steps of: reading out orthogonal transformation coefficients being the coded data; conducting a coefficient transformation by an operation process on the orthogonal transformation coefficients; and outputting the orthogonal transformation coefficients after having the image size enlarged or reduced, thus executing an enlargement or a reduction of the image.

According to a second aspect of the present invention, there is provided an image size transformation method for an orthogonal transformation coded image, enlarging an image size to output a decoded image, in respect with an image compressing and coding using an orthogonal transformation, comprising the steps of: reading out orthogonal transformation coefficients being coded by an N point orthogonal transformation, where N is a natural number; conducting a coefficient transformation by an operation process on the orthogonal transformation coefficients; calculating to obtain orthogonal transformation coefficients, after having the image size enlarged by a certain integer; and decoding the calculated transformation coefficients by an N point inverse orthogonal transformation so as to output an enlarged image, thus executing enlargement and decoding of a coded image.

According to a third aspect of the present invention, there is provided an image size transformation method for an orthogonal transformation coded image, coding an image into hierarchies to obtain a plurality of decoded images with different sizes, comprising a coding stage and a decoding stage. The coding stage includes the steps of: provided that an input image is being previously hierarchically organized according to different sizes; conducting an orthogonal transformation with respect to each hierarchy to obtain an orthogonal transformation coefficient; coding the orthogonal transformation coefficient of the lowest hierarchy with the smallest image size such that it should be outputted as coded data; obtaining difference data between an orthogonal transformation coefficient of a subject hierarchy and orthogonal transformation coefficients of the other lower hierarchies with smaller image sizes having been enlarged on the coefficients; and coding the obtained difference data such that it should be outputted as coded data. The decoding stage includes the steps of: conducting an inverse coding process on the coded data to obtain difference data between an orthogonal transformation coefficient of the lowest hierarchy and orthogonal transformation coefficients of the other hierarchies; adding together the difference data of the subject hierarchy and the orthogonal transformation coefficients of the other lower hierarchies except for the lowest having been enlarged by an enlargement process on the coefficients, so as to consecutively obtain through a calculation process an orthogonal transformation coefficient for each hierarchy starting from the lower hierarchies; and conducting an inverse orthogonal transformation on the obtained orthogonal transformation coefficient of each hierarchy to finally restore and output hierarchically decoded images.

According to a fourth aspect of the present invention, there is provided an image size transformation method for an orthogonal transformation coded image, reducing an image size to output a decoded image, in respect with an image compressing and coding using an orthogonal transformation, comprising the steps of: reading out orthogonal transformation coefficients being coded by an N point orthogonal transformation, where N is a natural number; conducting a coefficient transformation by an operation process on the orthogonal transformation coefficients; calculating to obtain orthogonal transformation coefficients, after having the image size reduced; and decoding the calculated transformation coefficients by an N point inverse orthogonal transformation so as to output a reduced image, thus obtaining a reduced decoded image of a coded image.

According to a fifth aspect of the present invention, there is provided an image size transformation method for an orthogonal transformation coded image, coding an image into hierarchies to obtain a plurality of decoded images with different sizes, comprising a coding stage and a decoding stage. The coding stage includes the steps of: conducting an orthogonal transformation on an input image to obtain orthogonal transformation coefficients; conducting a hierarchical reduction process on the obtained orthogonal transformation coefficients to obtain data of orthogonal transformation coefficients constructed in a plurality of hierarchies of different image sizes; coding the orthogonal transformation coefficient of the lowest hierarchy with the smallest image size such that it should be outputted as coded data; obtaining difference data between an orthogonal transformation coefficient of a subject hierarchy and orthogonal transformation coefficients of the other lower hierarchies with smaller image sizes having been enlarged on the coefficients; and coding the obtained difference data such that it should be outputted as coded data. The decoding stage includes the steps of: conducting an inverse coding process on the coded data to obtain difference data between an orthogonal transformation coefficient of the lowest hierarchy and orthogonal transformation coefficients of the other hierarchies; adding together the difference data of the subject hierarchy and the orthogonal transformation coefficients of the other lower hierarchies except for the lowest having been enlarged by an enlargement process on the coefficients, so as to obtain through a calculation process an orthogonal transformation coefficient for each hierarchy; and conducting an inverse orthogonal transformation on the obtained orthogonal transformation coefficient of each hierarchy to finally restore and output hierarchically decoded images.

With respect to the above fifth aspect of the present invention, in the decoding stage, the orthogonal transformation coefficient for each hierarchy can be obtained consecutively through a calculation process starting from the lower hierarchies.

BRIEF DESCRIPTION OF THE DRAWINGS

The above and further objects and the novel feature of the invention will more fully appear from the following detailed description when the same is read in connection with the accompanying drawings, in which.

DESCRIPTION OF THE PREFERRED EMBODIMENTS

Figure 1:
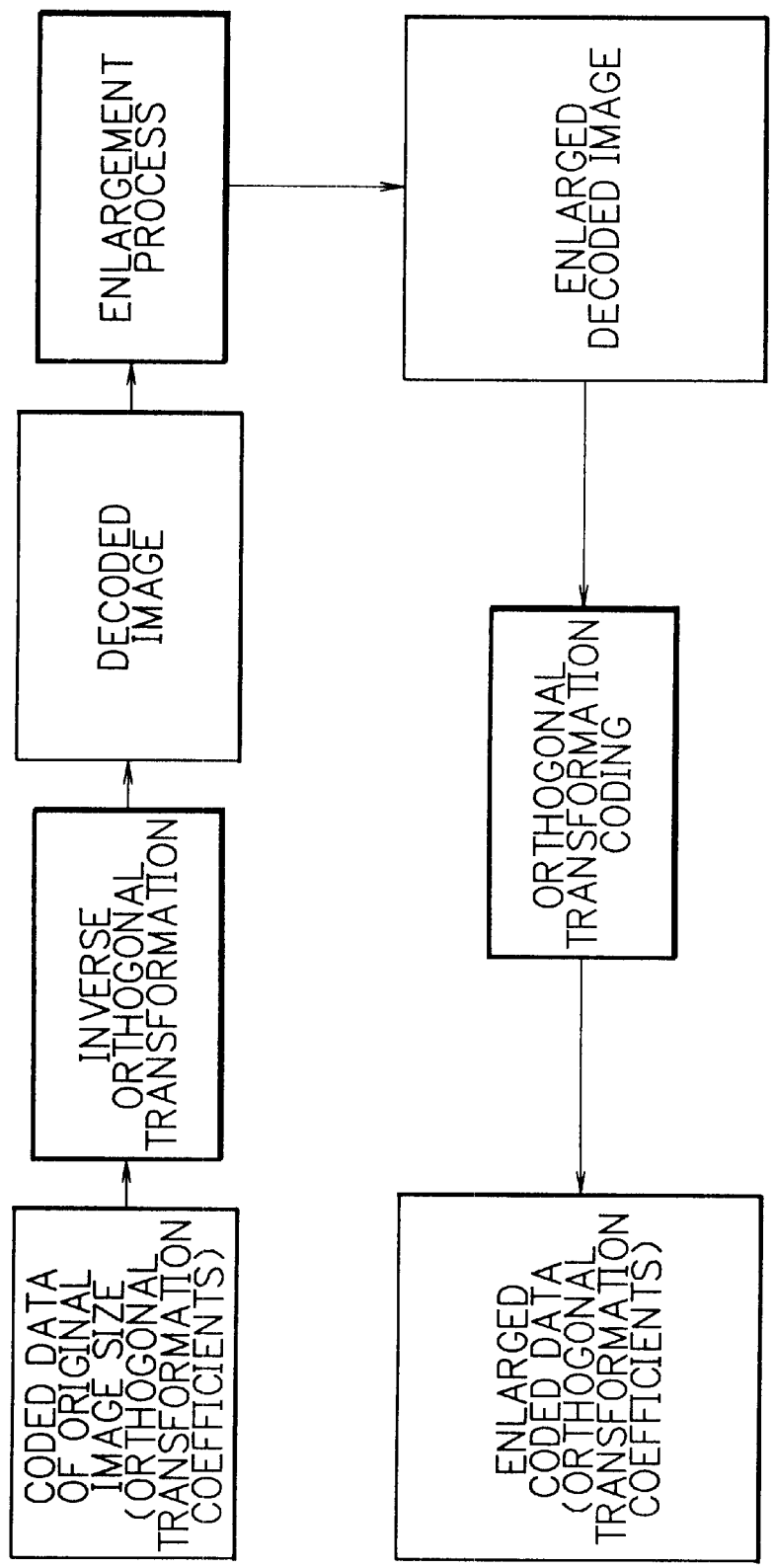
FIG. 1 is a diagram showing a procedure of an enlargement process for orthogonal transformation coded data, according to a conventional image size transformation method.
Figure 2:
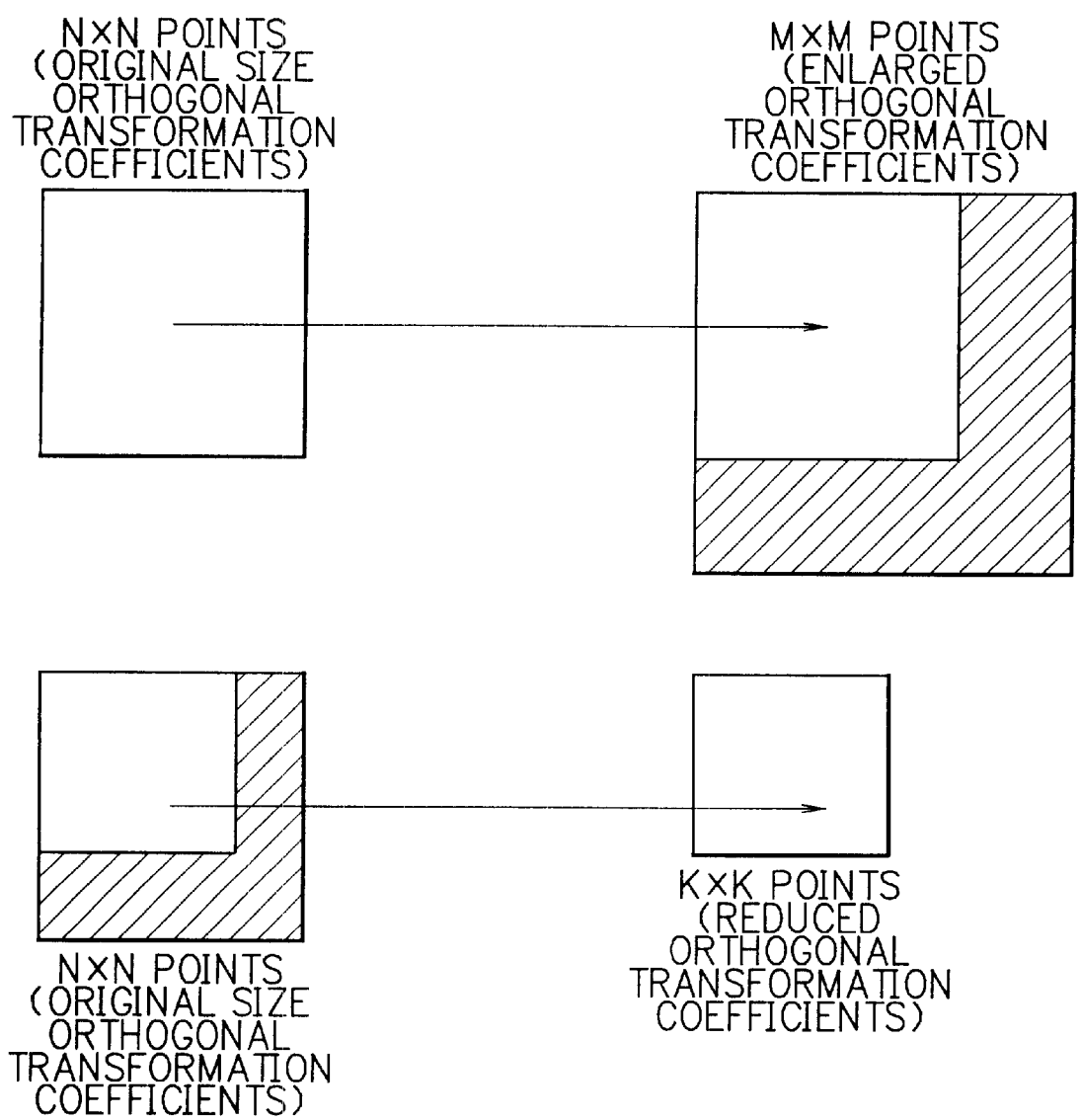
FIG. 2 is a diagram showing a concept of enlarging and reducing of orthogonal transformation coded data, according to a conventional image size transformation method.

Referring now to the drawings, a description of preferred embodiments of the image size transformation method for orthogonal transformation coded image according to the present invention will be given in detail.

Figure 3:
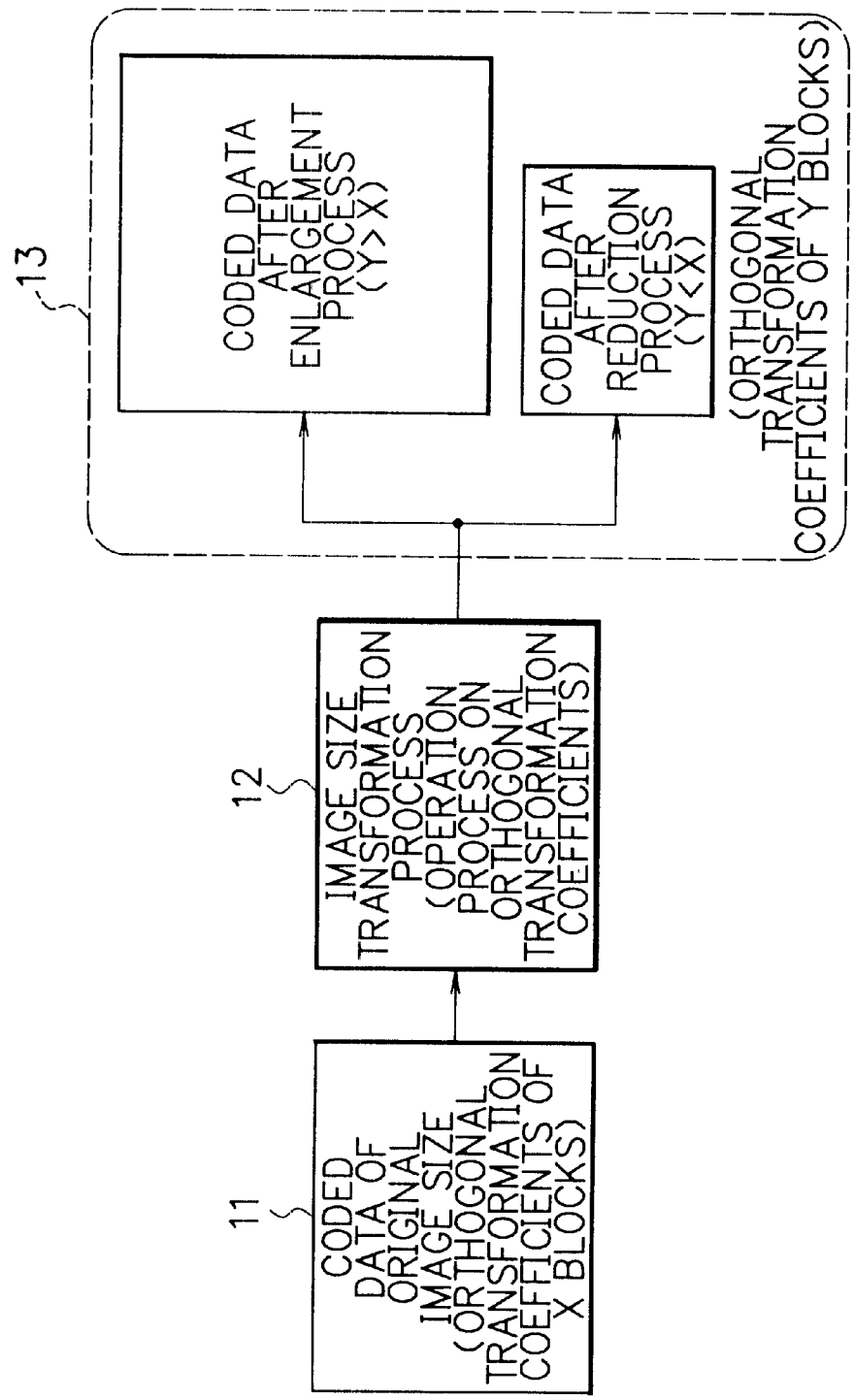
FIG. 3 is a diagram showing a first embodiment of an image size transformation method for an orthogonal transformation coded image, according to the present invention.

A first embodiment of the present invention will be described with reference to FIG. 3. FIG. 3 shows a processing procedure for enlargement and reduction of a coded image.

In FIG. 3, it is shown that image data of the original image becomes coded data 11, goes through an image size transformation process 12, and becomes orthogonal transformation coefficients 13 of Y blocks.

The coded data 11 of the original image size is data which is subjected to being transformed. The data of the original image is compressed and coded by the application of the orthogonal transformation, and the orthogonal transformation coefficients of the compressed and coded image are outputted as coded data of X blocks.

The orthogonal transformation coefficients entering the image size transformation process 12 then go through coefficient transformation by an operation process on the orthogonal transformation coefficients. The orthogonal transformation coefficients of Y blocks having gone through size transformation are outputted as coded data with an enlarged image size where Y>X, or a reduced image size where Y<X. In case of the enlarged image size, the coded data is that after the enlargement process. In case of the reduced image size, the coded data is that after the reduction process.

Figure 4:
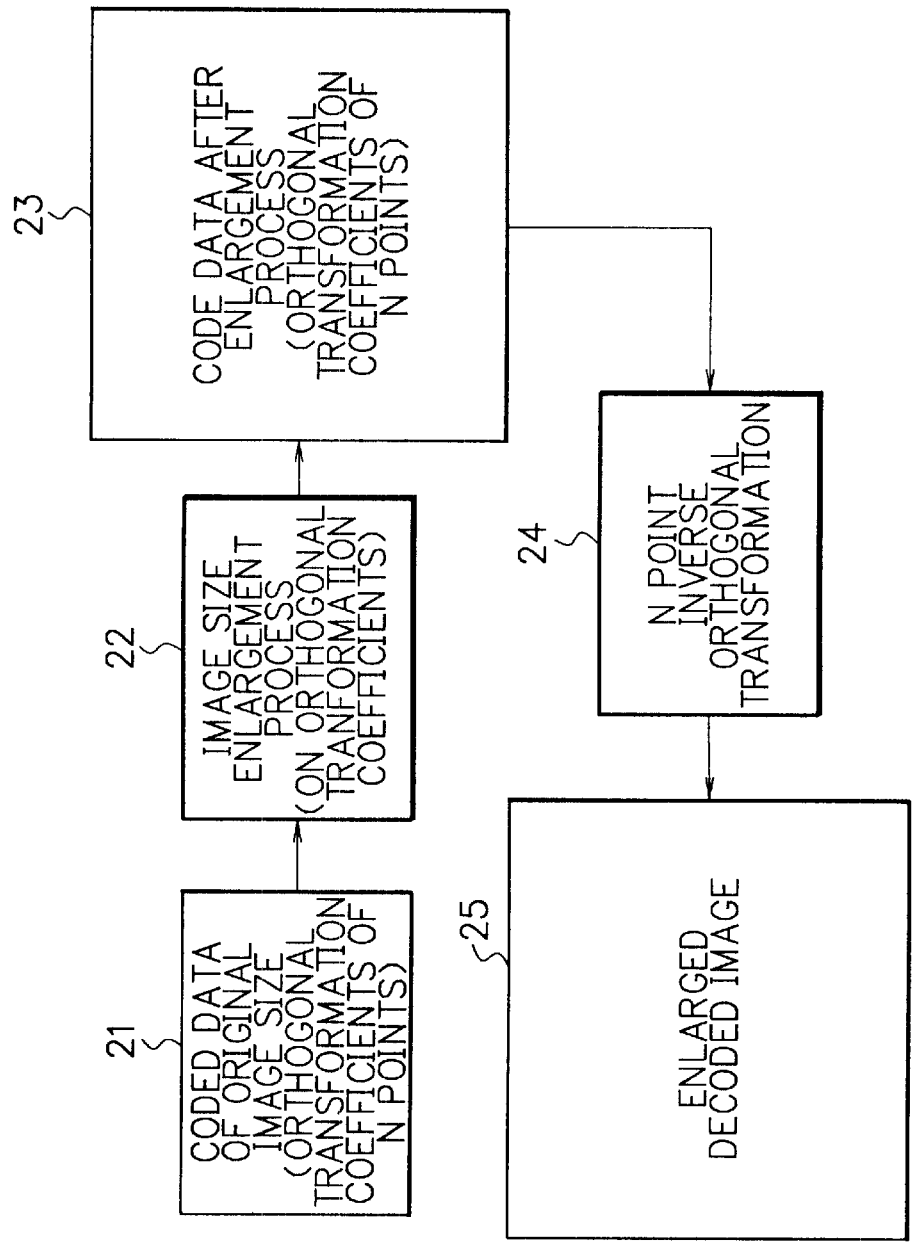
FIG. 4 is a diagram showing a second embodiment of an image size transformation method for an orthogonal transformation coded image, according to the present invention.

A second embodiment of the present invention will be described with reference to FIG. 4. FIG. 4 shows a processing procedure of an enlargement decoding method for the coded image.

In the second embodiment, coded data 21 of the original image size goes through an image size enlargement process 22, becomes coded data 23 after being enlarged by a certain ratio (a positive integer), be decoded by an N point inverse orthogonal transformation 24 (N is a natural number), and then outputted as an enlarged decoded image 25.

In respect with the coded data 21 of the original image size, the orthogonal transformation process is done with respect to an N point block unit. The orthogonal transformation coefficients of N points are then outputted as coded data.

The inputted orthogonal transformation coefficients go through coefficient transformation due to an operation process on the orthogonal transformation coefficients by the image size enlargement process 22. Owing to this image size enlargement process, the coded data 23 being enlarged by a certain positive integer is outputted. That is, orthogonal transformation coefficients with an enlarged image size are outputted as coded data. In the enlargement process, input coefficient data of a single N point block is processed to be transformed such that a plurality of N point blocks according to the magnification are outputted.

Then the enlarged orthogonal transformation coefficients are decoded by the N point orthogonal transformation 24 by a block unit to output the decoded image 25. With respect to this inverse orthogonal transformation, a transformation process of the same block length as that at a time of compression is used. Therefore, it is possible to conduct a decoding process with the same inverse orthogonal transformation without having to depend on the image magnification.

Figure 5:
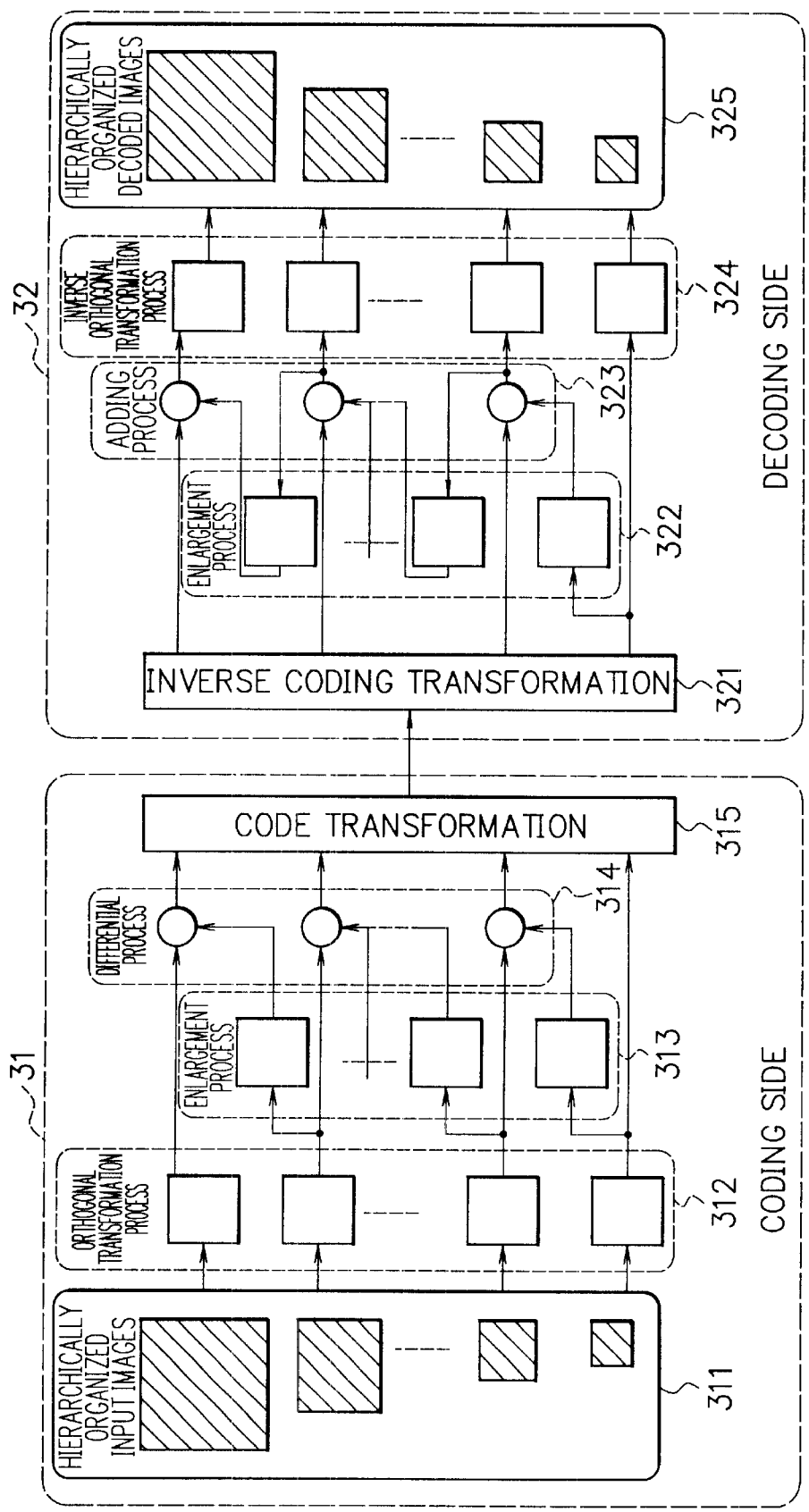
FIG. 5 is a diagram showing a third embodiment of an image size transformation method for an orthogonal transformation coded image, according to the present invention.

A third embodiment of the present invention will be described with reference to FIG. 5. FIG. 5 shows a processing procedure of a hierarchical coding decoding method.

The basic structure of the third embodiment is made of a coding side 31 and a decoding side 32. In the coding side 31, hierarchically arranged input images 311 go through an orthogonal transformation process 312, an enlargement process 313, a differential process 314, and a code transformation 315.

In the decoding side 32, the data having gone through the code transformation 315 further goes through an inverse orthogonal transformation 321, an enlargement process 322, an adding process 323, and an inverse orthogonal transformation process 324, so as to become hierarchically organized decoded images 325.

To be more specific, in the coding side 31, the input images are previously hierarchically organized according to different image sizes, which are regarded as input image data 311 as a whole. The image data entering the orthogonal transformation process 312 goes through an orthogonal transformation by each hierarchy, after which orthogonal transformation coefficients are calculated and outputted. At the lowest hierarchy where the image size is the smallest, the orthogonal transformation coefficient is coded to be outputted as coded data. With respect to other hierarchies, difference data between the orthogonal transformation coefficient of the subject hierarchy and the orthogonal transformation coefficients of the lower hierarchies having been enlarged by the enlargement process 312, is obtained by the differential process 314. Then the difference data goes through the coding process 315 to be outputted as coded data.

In the decoding side 32, the coded data being processed at the coding side 31, further goes through the inverse coding transformation 321, after which difference data between orthogonal transformation coefficients of the lowest hierarchy and the other hierarchies are obtained. At the hierarchies except for the lowest, difference data of the subject hierarchy and the orthogonal transformation coefficients recovered at the lower hierarchies being enlarged by the enlargement process 322, are added together by the adding process 323. By this procedure, an orthogonal transformation coefficient for each hierarchy is obtained.

A combination of the enlargement process 322 and the adding process 323 is consecutively carried out starting from the lower hierarchies. Finally, each orthogonal transformation coefficient being recovered for each hierarchy goes through the inverse orthogonal transformation process 324, by which the decoded images 325 organized in a plurality of hierarchies according to different image sizes are outputted.

Figure 6:
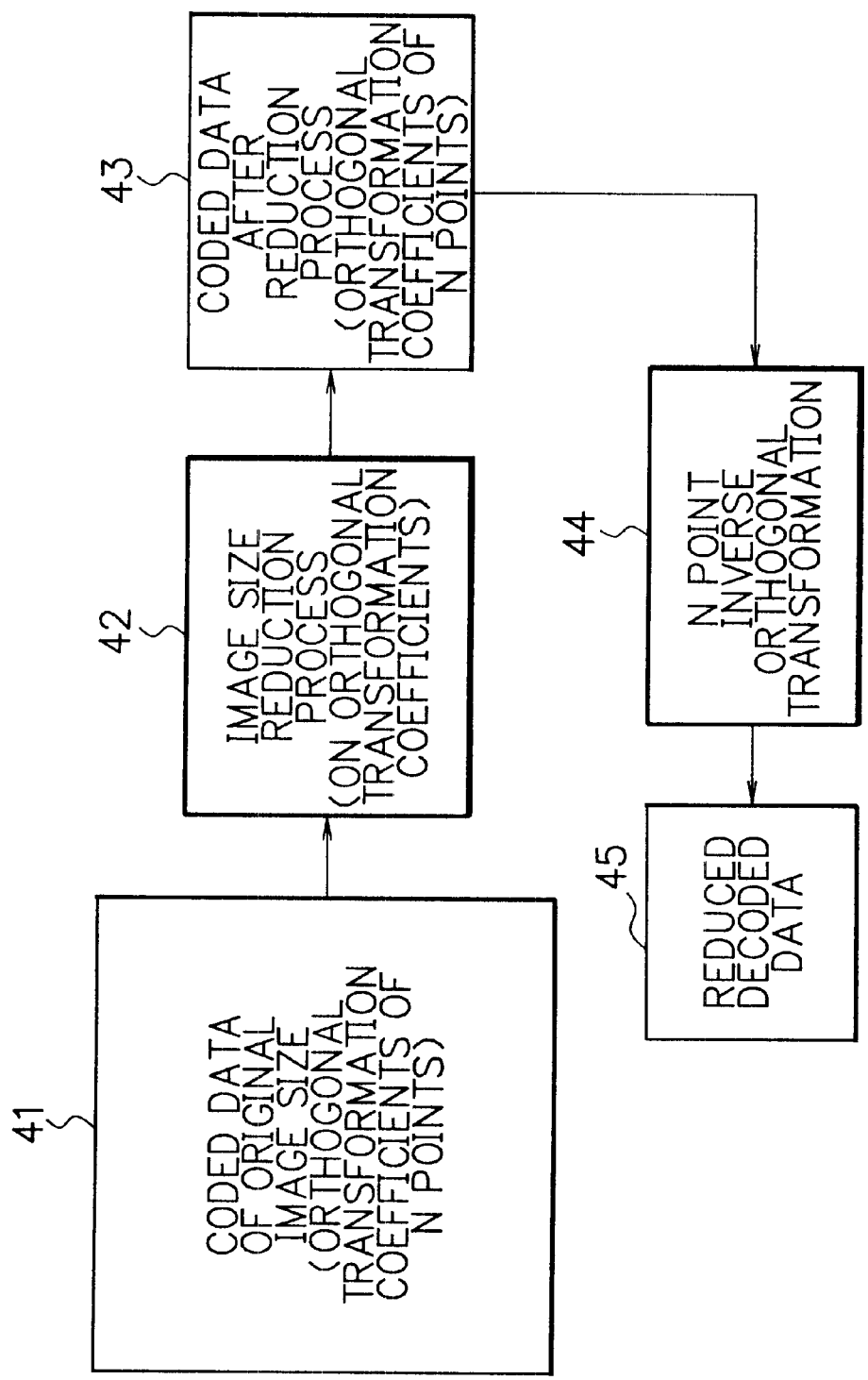
FIG. 6 is a diagram showing a fourth embodiment of an image size transformation method for an orthogonal transformation coded image, according to the present invention.

A fourth embodiment of the present invention will be described with reference to FIG. 6. FIG. 6 shows a processing procedure of a reduction decoding method.

According to the fourth embodiment, coded data 41 of the original image goes through image size reduction process 42 to be reduced by an integer ratio of 1/R on the orthogonal transformation coefficients to become coded data 43. The coded data 43 is then decoded by an N point inverse orthogonal transformation 44 (N is a natural number), and outputted as a decoded image 45.

To be more precise, in FIG. 6, the orthogonal transformation coefficients of the image being compressed and coded with an application of the orthogonal transformation by an N block unit are inputted as coded data 41. By the image size reduction process 42, the inputted orthogonal transformation coefficients go through a coefficient transformation due to an operation process on the orthogonal transformation coefficients. Then the orthogonal transformation coefficients with a reduced image size are outputted as coded data 43. In the reduction process 42, input coefficient data of a plurality of N point blocks according to reduction ratios is transformed, and then coefficient data of a single N point block is outputted. Next, the orthogonal transformation coefficients having been through the reduction process are decoded by the N point inverse orthogonal transformation 44 by a block unit, so as to output the reduced decoded image 45. With respect to this inverse orthogonal transformation, a transformation process of the same block length as that at a time of compression is used. Therefore, it is possible to conduct the decoding process with the same inverse orthogonal transformation without having to depend on the reduction ratio of the image.

Figure 7:
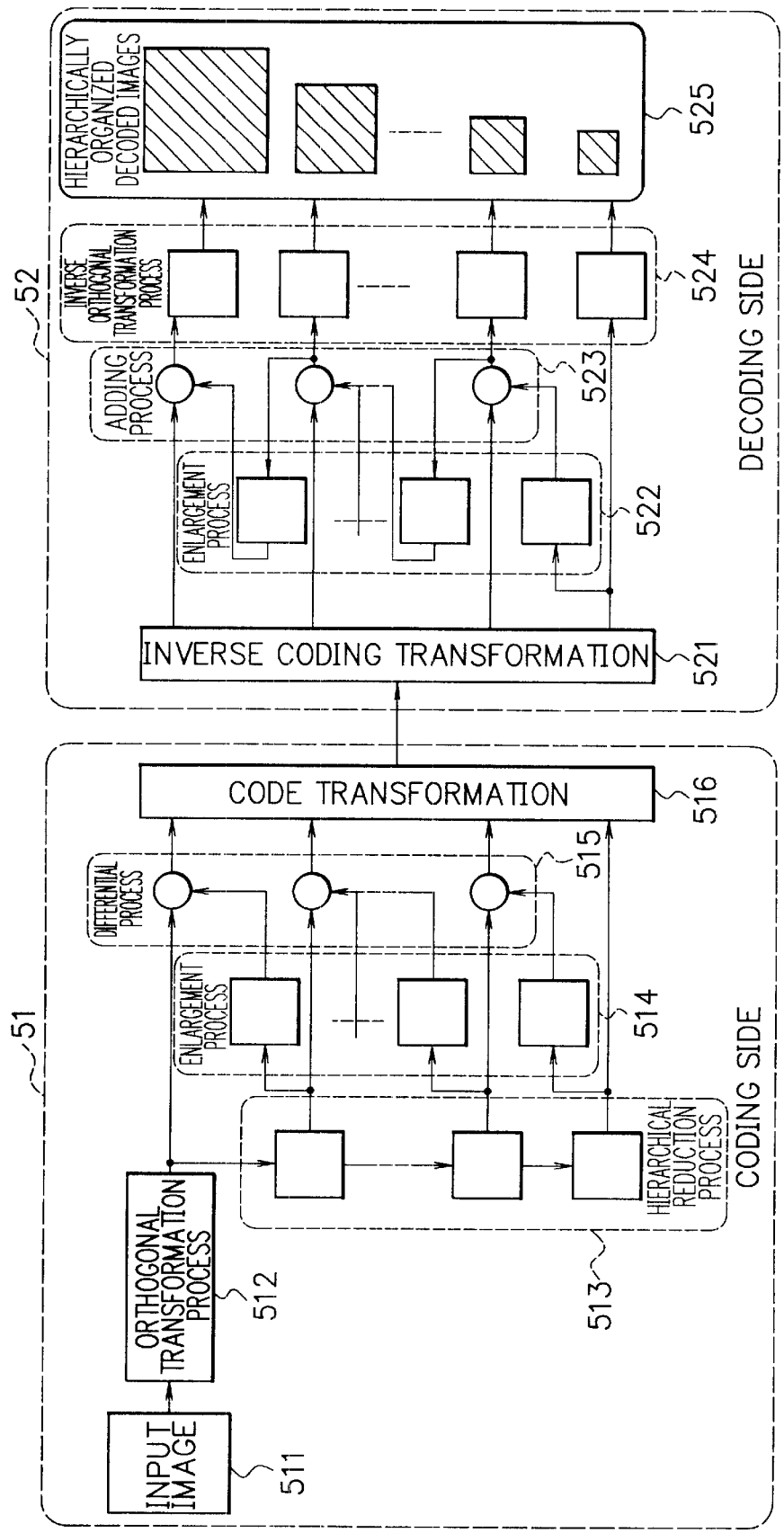
FIG. 7 is a diagram showing a fifth embodiment of an image size transformation method for an orthogonal transformation coded image, according to the present invention.

A fifth embodiment of the present invention will be described with reference to FIG. 7. FIG. 7 shows a processing procedure of a hierarchical coding decoding method.

The basic structure of the fifth embodiment is made of a coding side 51 and a decoding side 52. In the coding side 51, an input image 511 goes through an orthogonal transformation process 512, a hierarchical reduction process 513, an enlargement process 514, a differential process 515, and a code transformation 516.

In the decoding side 52, the coded data from the code transformation 516 goes through an inverse coding transformation 521, an enlargement process 522, an adding process 523, and an inverse orthogonal transformation process 524, so as to become hierarchically decoded images 525.

To be more specific, in the coding side 51, the input image 511 goes through the orthogonal transformation 512, after which orthogonal transformation coefficients are calculated and outputted. Then the orthogonal transformation coefficients go through the hierarchical reduction process 513, by which orthogonal transformation coefficient data organized in a plurality of hierarchies according to different image sizes are calculated and outputted. At the lowest hierarchy where the image size is the smallest, the orthogonal transformation coefficient goes through the code transformation 516 to be outputted as coded data. With respect to other hierarchies, difference data between the orthogonal transformation coefficient of the subject hierarchy and the orthogonal transformation coefficients of the lower hierarchies having been enlarged by the enlargement process 514, is obtained by the differential process 515. Then this difference data goes through the coding process 516 to be outputted as coded data.

In the decoding side 52, the coded data being processed at the coding side 51, goes through the inverse coding transformation 521, after which difference data between orthogonal transformation coefficients of the lowest hierarchy and the other hierarchies are obtained. At the hierarchy except for the lowest, difference data of the subject hierarchy and the orthogonal transformation coefficients being restored at the lower hierarchies being enlarged by the enlargement process 522, are added together by the adding process 523. By this procedure, an orthogonal transformation coefficient for each hierarchy is obtained. A combination of the enlargement process 522 and the adding process 523 is consecutively carried out starting from the lower hierarchies. Finally, each orthogonal transformation coefficient being recovered for each hierarchy goes through the inverse orthogonal transformation process 524, by which the decoded images 525 organized in a plurality of hierarchies according to different image sizes, are outputted.

In the following, a concept of the orthogonal transformation, which is being referred to in describing the above embodiments, will be described. As to a typical orthogonal transformation applied for an image compressing/coding, there are discrete cosine transformation, Hadamard transformation etc. With respect to the enlargement/reduction method for a coded image according to the present invention, in a compressing/coding process of an image using such orthogonal transformation, the image size is enlarged or reduced according to an operation on the orthogonal transformation coefficients, by which coded data having gone through the enlargement or reduction process is generated. To begin with, an operational principle of such process will be described. In addition, as to the above-mentioned typical orthogonal transformations, they are usually employed as two-dimentional transformations, although each of them can be separated into one-dimentional orthogonal transformation in respect with a horizontal direction or a vertical direction, respectively. Accordingly, the description below will be of a process relating to a one-dimentional orthogonal transformation.

A matrix of input image data divided into N point length of blocks is referred to as "f". A matrix of orthogonal transformation bases is referred to as "C". A matrix of coefficient data after transformation is referred to as "F". Provided with the above, a transformation process can be expressed by a formula (1): F=Cf.

According to the image size transformation method of the present invention, the matrix F of the coefficient data is transformed to a matrix of coefficient data with a different length.

First, an enlargement process will be described with reference to FIGS. 8, 9 and 10.

Figure 8:
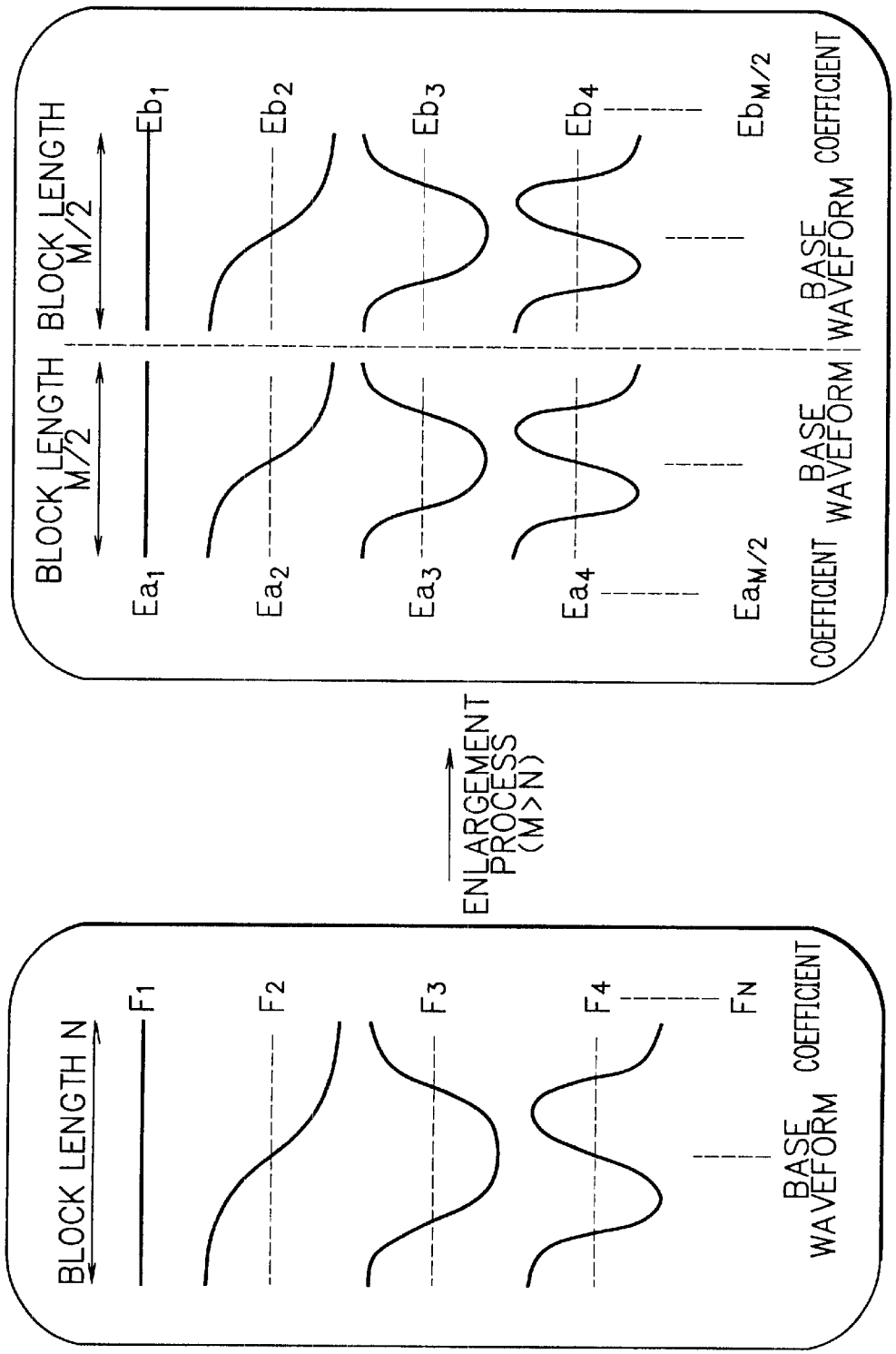
FIG. 8 is a diagram showing a concept of an enlargement process according to the present invention.

FIG. 8 is a diagram showing a principle of the enlargement process according to the present invention, where a discrete cosine transformation is used as a concrete example of the orthogonal transformation. The orthogonal transformation coefficient data F of an N point length block, which is being compressed and coded due to the discrete cosine transformation, is transformed into two M/2 point length blocks of coefficient data, Ea and Eb, by which M/N time enlargement is made possible. Coefficients $F_k$, $Ea_i$, and $Eb_j$ are values showing signal strength of a cosine transformation base waveform, respectively. With respect to the image size transformation method of the present invention, the coefficients $Ea_i$ and $Eb_j$ are expressed in terms of linear sums of $F_k$.

Figure 9:
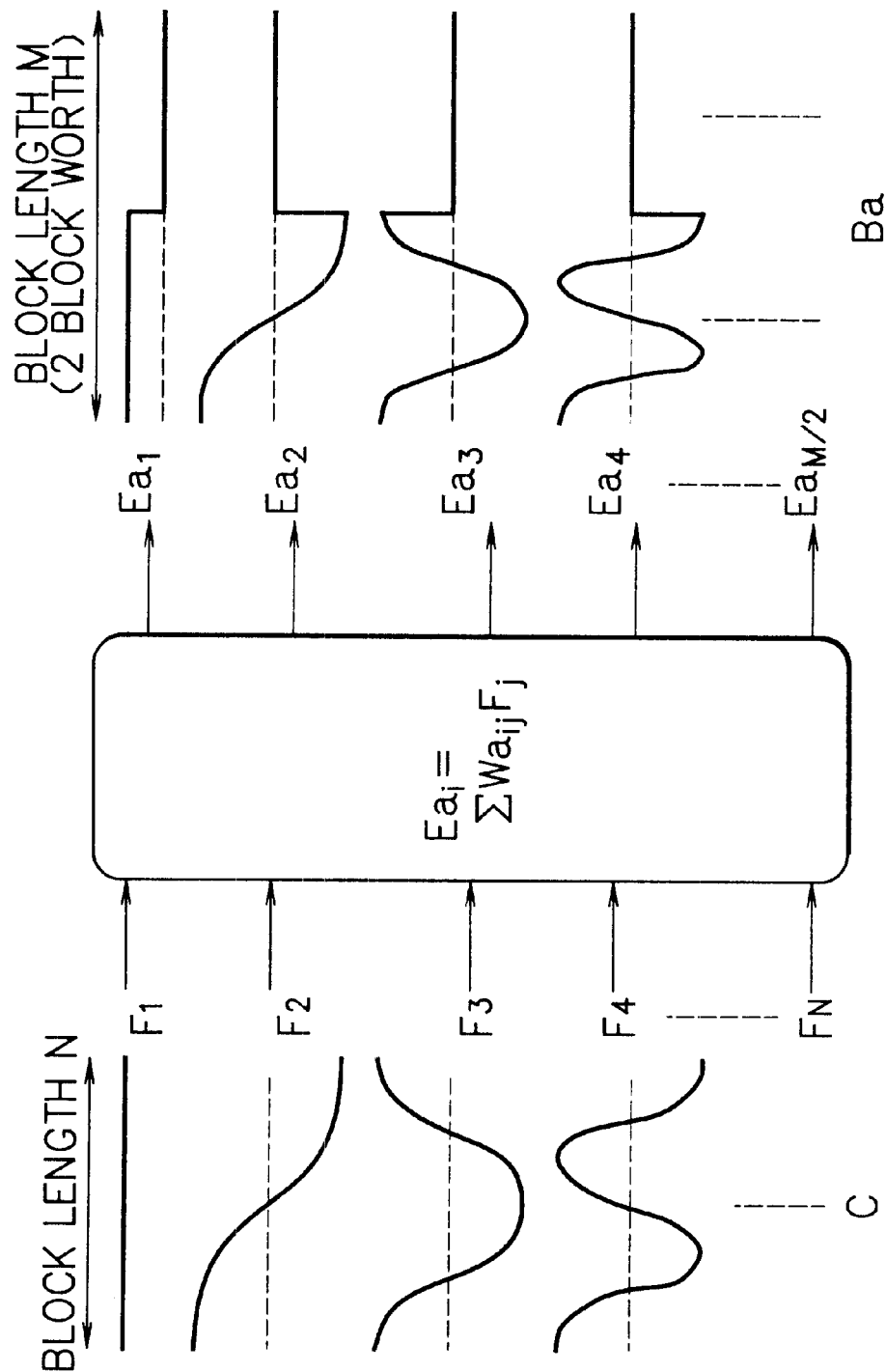
FIG. 9 is a diagram showing a procedure of an enlargement process according to the present invention.
Figure 10:
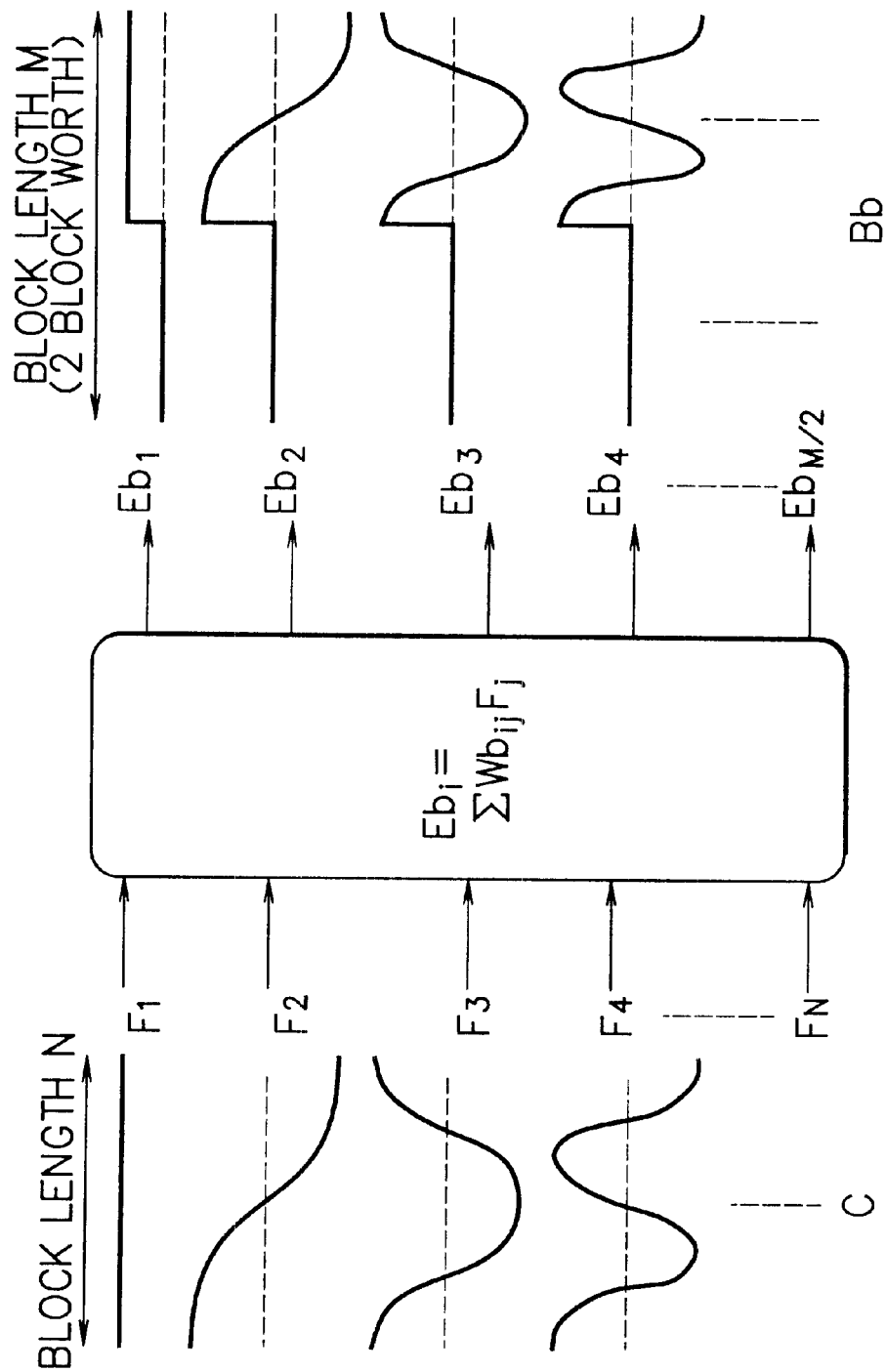
FIG. 10 is another diagram showing a procedure of an enlargement process according to the present invention.

FIGS. 9 and 10 show a principle of the above-mentioned enlargement process. In particular, FIG. 9 shows the relationship of the coefficients $Ea_i$ and $F_k$. In FIG. 9, out of two blocks after enlargement, only the transformation base waveform of the left block is maintained, while the waveform of the reset of the part will have a zero amplitude, where a new matrix of M point length transformation bases Ba is being set. When Ba goes through the orthogonal transformation at the transformation base matrix C, a formula (2): $Wa=BaC^t$ is realized. In this event, $C^t$ is a transported matrix of C.

In FIG. 9, the block lengths of the transformation bases C and Ba are shown as different, although the lengths of the two base waveforms correspond to the same block range on the original image. Under such condition, in calculating the formula (2), phases of sampling points of C and Ba are adjusted to each other. To be more accurate, the base waveform of either C or Ba goes through expansion/contraction to be adjusted to the other, after which formula (2) should be calculated. Then as the formula (2) is inverted by the transformation base matrix C, it becomes formula (3): Ba=WaC.

That is, in between the transformation base matrix Ba and the original transformation base matrix C, a relational expression of a linear sum by a polyaddition constant Wa is made possible. Because the coefficient data Ea of the left block after enlargement corresponds to the signal strength of the transformation base Ba, the relationship between F and Ea can be described likewise. The relational expression is expressed by a formula (4): $Ea_i = \Sigma Wa_{ij} F_j$.

The value of $Wa_{ij}$ can be obtained by calculating the formula (2), and be determined inevitably by the two transformation base matrixes C and Ba. That is, $Wa_{ij}$ can be calculated according to a type of orthogonal transformation and a block length before and after the enlargement process.

FIG. 10 shows the relationship of the coefficients $Eb_i$ and $F_k$. Out of two blocks after enlargement, only the transformation base waveform of the right block is maintained, while the waveform of the reset of the part will have a zero amplitude, where a new matrix of M point length transformation bases Bb is being set. Then, by following the same procedure explained with reference to FIG. 9, relational expressions (5) and (6) can be obtained.

$$Wb = BbC^t \quad (5)$$

$$Eb_i = \Sigma Wb_{ij} F_j \quad (6)$$

According to the above-described process, two blocks of coefficient data Ea and Eb having a M/2 point block length are calculated from the orthogonal transformation coefficient data F having an N point block length, by which a M/N time enlargement is made possible. When the magnification M/N is 2, each block of a M/2 point length would become the same size as the original block of an N point length, by which decoding is made possible by an inverse orthogonal transformation which is the same as the case when enlargement is not carried out. In this manner, by equalizing the lengths of the block before and after enlargement, it is easy to include the enlargement process according to the present invention to the conventional coding systems using the orthogonal transformation of a fixed block length, such as JPEG, MPEG etc.

In the above explanation, coefficient data of a single block is developed into two blocks of coefficient data due to the enlargement process. However, the number of blocks after the enlargement process does not necessarily have to be 2 but can be an arbitrary number. In this case also, following the same procedure as described above, the polyaddition constant $W_{ij}$ is calculated for each block, by which coefficient data after the enlargement process can be obtained.

Next, with reference to FIGS. 11 and 12, a reduction process of the present invention will be described.

Figure 11:
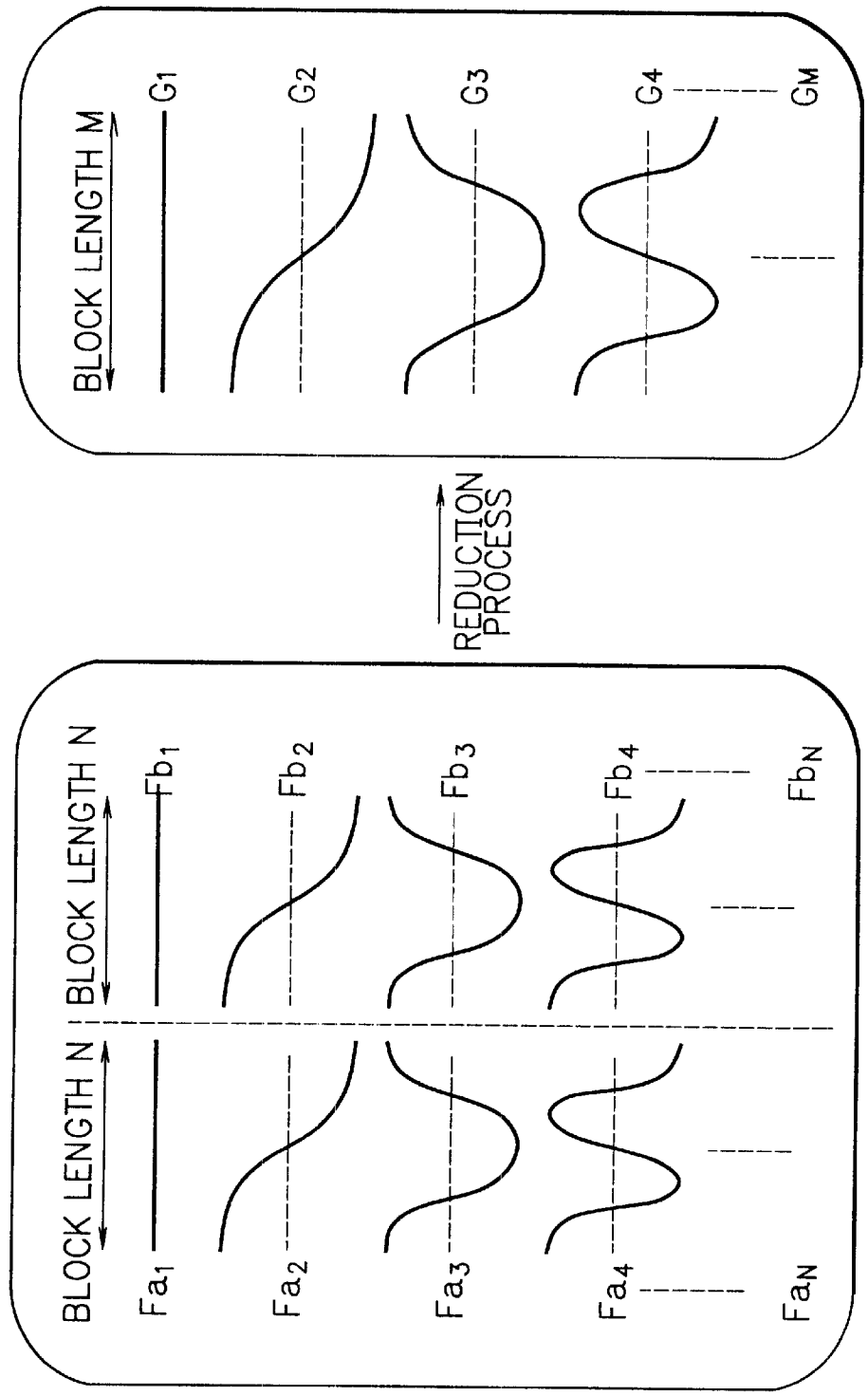
FIG. 11 is a diagram showing a concept of a reduction process according to the present invention.

FIG. 11 is a diagram showing a principle of the reduction process according to the present invention. Orthogonal transformation data Fa and Fb of two N point length blocks, which is being compressed and coded due to the discrete cosine transformation, is transformed into a single M point length block of coefficient data G, by which a M/2N time reduction is made possible. Coefficients $G_k$, $Fa_i$, and $Fb_j$ are values showing signal strength of a cosine transformation base waveform, respectively. With respect to the image size transformation method of the present invention, the coefficient data G is expressed in terms of linear sums of Fa and Fb.

Figure 12:
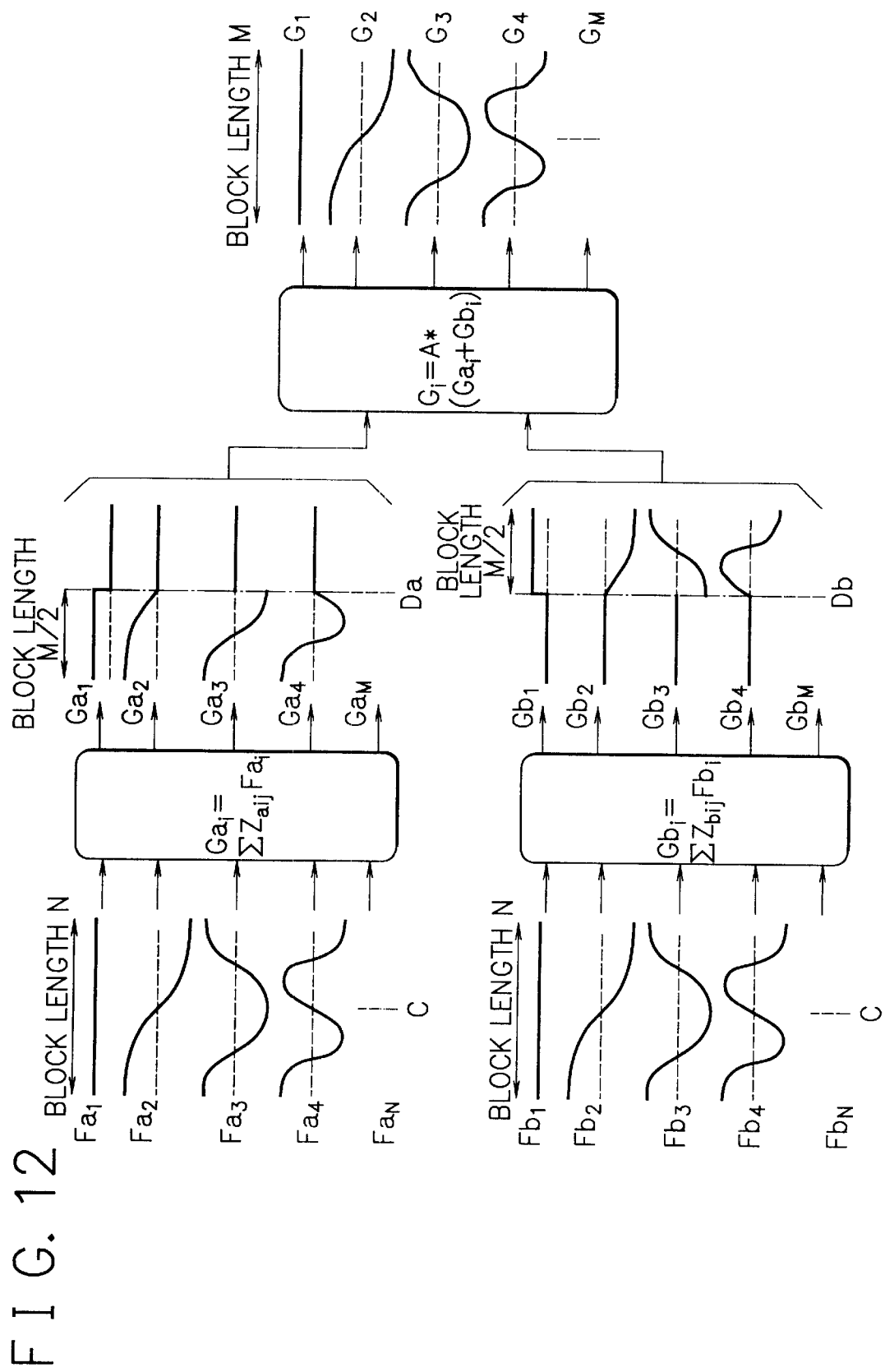
FIG. 12 is a diagram showing a procedure of a reduction process according to the present invention.

Along with FIG. 11, FIG. 12 also shows the principle of the reduction process of the present invention. In FIG. 12, a signal component Ga of a left half of a block after the reduction process, is obtained from a coefficient Fa of a left block before the reduction process. On the other hand, a signal component Gb of a right half of a block after the reduction process, is obtained from a coefficient Fb of a right block before the reduction process. After that, the average of Ga and Gb is calculated, so that the coefficient data G of the whole blocks after the reduction process is finally obtained.

Next, a process of calculating Ga will be explained. Among the whole blocks after the reduction process, only the transformation base waveforms of the left halves of them are sampled, and set as a new transformation base matrix Da having a M/2 block length, while the waveforms of the rest of the part not sampled is being cut off. When Da goes through the orthogonal transformation at the original transformation base matrix C: a formula (7): $Za = DaC^t$ is realized. In this event, $C^t$ is a transported matrix of C.

In FIG. 12, the block lengths of the transformation bases C and Da are shown as different, although the lengths of the two base waveforms correspond to the same block range on the original image. Under such condition, in calculating the formula (7), phases of sampling points of C and Da are adjusted to each other. To be more accurate, the base waveform of either C or Da goes through expansion/contraction to be adjusted to the other, after which the formula (7) should be calculated. Then as the formula (7) is inverted by the transformation base matrix C, it becomes a formula (8): Da=ZaC.

That is, in between the transformation base matrix Da and the original transformation base matrix C, a relational expression of a linear sum by a polyaddition constant Za is made possible. Because the coefficient data Ga of the left half of the block after reduction corresponds to the signal strength of the transformation base Da, the relationship between Fa and Ga can be described likewise. The relational expression of Fa and Ga is expressed by a formula (9): $Ga_i = \Sigma Za_{ij} Fa_j$.

The value of $Za_{ij}$ can be obtained from the formula (7). The coefficient data Gb of the right half of the block after reduction and Fb could have the same sort of relationship as in the case of Ga and Fa. Therefore, their relationship can be expressed by the following formulas (10) and (11).

$$Zb = DbC^t \quad (10)$$

$$Gb_i = \Sigma Zb_{ij} Fb_j \quad (11)$$

In this case, Db is a new transformation base matrix with a M/2 point block length, in which only the right halves of the transformation base waveforms after reduction are sampled out, as shown in FIG. 12. By such processing procedure, coefficient data Ga and Gb corresponding to signal components of the right and the left halves of the block having been through the reduction process, are obtained separately. Then by obtaining the average of Ga and Gb, the final coefficient data G of the reduced block as a whole is calculated.

In this event, a transformation base waveform corresponding to each coefficient of G, will have a correlation only with the transformation base waveforms of Da and Db having the same frequency component. Therefore, G is given by a simple linear sum as a formula (12): $G_i = A(Ga_i + Gb_i)$. In the formula (12), A is an amplitude correction term, which is a constant inevitably determined by a reduction ratio, i.e. a block length before and after the reduction process.

In FIG. 11, especially when the reduction ratio M/2N is 1/2, each block of an M point length would become the same size as the original block of an N point length, by which decoding is made possible by an inverse orthogonal transformation which is the same as the case when reduction is not carried out. In the above explanation, coefficient data of two blocks is reduced to coefficient data of a single block by the reduction process. However, a block number before the reduction process can be any number.

According to the present invention, in transforming an image size of a coded image using the orthogonal transformation, orthogonal transformation coefficients being enlarged/reduced by a direct operation process on the orthogonal transformation coefficients, are obtained. Owing to such procedure, it is possible to eliminate the necessity of inversion or repetition of another orthogonal transformation, as required in the conventional case, by which the amount of operation can be reduced.

Furthermore, according to the present invention, especially when choosing a transformation by a magnification/reduction ratio of an integral number, which is used practically in many occasions, it is possible to equalize the sampling points of the coefficient's block before and after the enlargement or reduction process. Because of this, decoding becomes possible by a common reverse orthogonal transformation process, even after the image size is changed, which gives an advantage that a structure of the decoding system would be simplified.

As it is clear from the above description, according to the present invention, in transforming the image size of the coded image data using the orthogonal transformation, the orthogonal transformation coefficients having been through the size transformation by the direct operation process on the orthogonal transformation coefficients are obtained. Owing to such procedure, it is possible to simplify the process of image size transformation and thus reduce the amount of operation.

Moreover, especially when choosing a transformation by a magnification/reduction ratio of an integral number, it is possible to generate coefficient data which can be decoded by an inverse orthogonal transformation, having the same block length as the one at a time of initial coding. Because of this, a structure of the decoding system can be simplified.

Furthermore, according to the conventional image size transformation methods, operation errors can be induced due to inversion, filtering process etc. which leads to a possibility of degrading the transformation efficiency. According to the present invention, however, the orthogonal transformation coefficients are directly processed on the coefficients, by which a transformation with a high precision can be obtained.

While preferred embodiments of the invention have been described using specific terms, such description is for illustrative purposes only, and it is to be understood that changes and variations may be made without departing from the spirit or the scope of the following claims.

What is claimed is:

1. An image size transformation method for an orthogonal transformation coded image, enlarging or reducing an image size of coded data, in combination with image compressing and coding using an orthogonal transformation, comprising the steps of:

reading out N point orthogonal transformation coefficients in accordance with an N point inverse transformation function of a decoder being the coded data;

conducting a coefficient transformation by an operation process in accordance with a desired size transformation by a certain integer on the N point orthogonal transformation coefficients; and outputting the N point orthogonal transformation coefficients after having the image size enlarged or reduced by said certain integer, thus enabling an enlargement or a reduction of the image when decoded by said decoder.

2. An image size transformation method for an orthogonal transformation coded image, enlarging an image size to output a decoded image, in respect with an image compressing and coding using an orthogonal transformation, comprising the steps of:

reading out orthogonal transformation coefficients being coded by an N point orthogonal transformation, where N is a natural number;

conducting a coefficient transformation by an operation process on the orthogonal transformation coefficients to obtain orthogonal transformation coefficients, after having the image size enlarged by a certain integer; and decoding the transformation coefficients by an N point inverse orthogonal transformation so as to output an enlarged image, thus executing enlargement and decoding of a coded image.

3. An image size transformation method for an orthogonal transformation coded image, coding an image into hierarchies to obtain a plurality of decoded images with different sizes, comprising a coding stage and a decoding stage:

the coding stage including the steps of;

provided that an input image is being previously hierarchically organized according to different sizes, conducting an orthogonal transformation with respect to each hierarchy to obtain orthogonal transformation coefficients, coding the orthogonal transformation coefficient of the lowest hierarchy with the smallest image size such that it should be outputted as coded data, obtaining difference data between orthogonal transformation coefficients of a subject hierarchy and orthogonal transformation coefficients of the other lower hierarchies with smaller image sizes having been enlarged on the coefficients, and coding the obtained difference data such that it should be outputted as coded data, the decoding stage including the steps of;

conducting an inverse coding process on the coded data to obtain difference data between orthogonal transformation coefficients of the lowest hierarchy and orthogonal transformation coefficients of the other hierarchies, adding together the difference data of the subject hierarchy and the orthogonal transformation coefficients of the other lower hierarchies except for the lowest having been enlarged by an enlargement process on the coefficients, so as to consecutively obtain through a calculation process orthogonal transformation coefficients for each hierarchy starting from the lower hierarchies, and conducting an inverse orthogonal transformation on the obtained orthogonal transformation coefficients of each hierarchy to finally restore and output hierarchically decoded images.

4. An image size transformation method for an orthogonal transformation coded image, reducing an image size to output a decoded image, in respect with an image compressing and coding using an orthogonal transformation, comprising the steps of:

reading out orthogonal transformation coefficients being coded by an N point orthogonal transformation, where N is a natural number;

conducting a coefficient transformation by an operation process on the orthogonal transformation coefficients to obtain orthogonal transformation coefficients, after having the image size reduced; and decoding the transformation coefficients by an N point inverse orthogonal transformation so as to output a reduced image, thus obtaining a reduced decoded image of a coded image.

5. An image size transformation method for an orthogonal transformation coded image, coding an image into hierarchies to obtain a plurality of decoded images with different sizes, comprising a coding stage and a decoding stage:

the coding stage including the steps of;

conducting an N point orthogonal transformation on an input image to obtain orthogonal transformation coefficients, conducting a hierarchical reduction process on the obtained orthogonal transformation coefficients to obtain data of N point orthogonal coefficients constructed in a plurality of hierarchies of different image sizes, coding the orthogonal transformation coefficients of the lowest hierarchy with the smallest image size such that it should be outputted as coded data, obtaining difference data between orthogonal transformation coefficients of a subject hierarchy and orthogonal transformation coefficients of the other lower hierarchies with smaller image sizes having been enlarged on the coefficients, and coding the obtained difference data such that it should be outputted as coded data, the decoding stage including the steps of;

conducting an N point inverse coding process on the coded data to obtain difference data between orthogonal transformation coefficients of the lowest hierarchy and orthogonal transformation coefficients of the other hierarchies, adding together the difference data of the subject hierarchy and the orthogonal transformation coefficients of the other lower hierarchies except for the lowest having been enlarged by an enlargement process on the coefficients, so as to obtain through a calculation process orthogonal transformation coefficients for each hierarchy, and conducting an N point inverse orthogonal transformation on the obtained orthogonal transformation coefficients of each hierarchy to finally restore and output hierarchically decoded images.

6. An image size transformation method for an orthogonal transformation coded image according to claim 5, wherein;

in the decoding stage, the orthogonal transformation coefficients for each hierarchy can be obtained consecutively through a calculation process starting from the lower hierarchies.

* * * * *